C. BALL.

Toys.

No. 5,479. Reissued July 8, 1873.

Witnesses.

Chas H Smith.

Harold Serrell.

Inventor

Cortland Ball, per Lemuel W. Serrell atty.

AM. PHOTO-LITHOGRAPHIC CO. N.Y. (OSBORNE'S PROCESS)

UNITED STATES PATENT OFFICE.

CORTLAND BALL, OF AUGUSTA, MICHIGAN, ASSIGNOR OF ONE-HALF INTEREST TO THOMAS MARRIOTT.

IMPROVEMENT IN TOYS.

Specification forming part of Letters Patent No. 138,365, dated April 29, 1873; reissue No. 5,479, dated July 8, 1873; application filed May 27, 1873.

*To all whom it may concern:*

Be it known that I, CORTLAND BALL, of Augusta, in the State of Michigan, have invented an Improvement in Toys, of which the following is a specification:

Toys have been made with a cavity and a whistling-mouth in the side to produce a humming sound as revolved.

My present invention is designed to produce a warbling or undulating sound resembling the singing of a bird, so as to amuse children or others.

The invention consists in a hollow case made of any suitable material, and having a mouth in one side, and a connection at or near one end, by means of which it may be whirled around through the atmosphere, and receive a compound motion, one movement being in a plane, or nearly so, in which it is whirled by the movement of the hand and connecting-string, and the other being a partial rotation in line of the connection, so that the mouth is exposed to a greater or less atmospheric action as whirled around, and hence the warbling sound will be produced.

Figure 1:
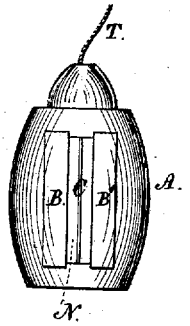
Figure 2:
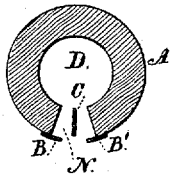

In the drawing, Figure 1 is an elevation, and Fig. 2 is a transverse section.

The shell or case A is hollow, and made of wood, metal, or other suitable material, and of any desired size or shape. The cavity D is in the interior of the shell, with a mouth, N, opening through the shell A into it. At one end the string or connection T is attached securely, and the toy is whirled around by this string T, which may be about two feet long, and have a ring or handle to be grasped, and moved around in nearly a circle to give the toy a rapid circular centrifugal whirl through the atmosphere, and the rotation of the toy with the string as an axis presents the whistling-mouth to various atmospheric actions, the air being most effective in producing sound when the mouth is nearly in the plane of rotation, hence the sounds will vary and a warbling tone be produced, as aforesaid.

If the toy is of wood, thin lips B B′ may be provided at the edges of the mouth, and these may be of sheet metal, and a tongue, *c*, made of Mexican reed, skin, or other material, may be introduced longitudinally of the mouth to modulate the tone.

I claim as my invention—

A toy, composed of a hollow case of cylindrical or other form, provided with an eye at one end for the attachment of a cord, and having an opening or mouth in its side, substantially as set forth, for producing a warbling sound when said toy is whirled through the air, as described.

Signed by me this 19th day of May, A. D. 1873.

CORTLAND BALL.

Witnesses:
GEO. T. PINCKNEY,
CHAS. H. SMITH.